(12) United States Patent
Grabmeier et al.

(10) Patent No.: US 8,371,535 B2
(45) Date of Patent: Feb. 12, 2013

(54) METHOD FOR RELEASING AN UNMANNED MISSILE FROM A CARRIER AIRCRAFT

(75) Inventors: Michael Grabmeier, Rosenheim (DE); Christine Stumpp, Dachau (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 710 days.

(21) Appl. No.: 12/508,793

(22) Filed: Jul. 24, 2009

(65) Prior Publication Data

US 2012/0061507 A1 Mar. 15, 2012

(30) Foreign Application Priority Data

Jul. 25, 2008 (DE) .......................... 10 2008 034 618

(51) Int. Cl.
*B64C 13/02* (2006.01)

(52) U.S. Cl. ...................................... 244/194; 244/3.15

(58) Field of Classification Search ................... 244/3.1, 244/3.15, 118.1, 137.4, 194, 3.24; 89/1.54
See application file for complete search history.

(56) References Cited

U.S. PATENT DOCUMENTS

| 2005/0134496 A1* | 6/2005 | Trainor | 342/14 |
| 2008/0035785 A1* | 2/2008 | Grabmeier | 244/3.1 |

* cited by examiner

*Primary Examiner* — Timothy D Collins
*Assistant Examiner* — Nicholas McFall
(74) *Attorney, Agent, or Firm* — Greenblum & Bernstein, P.L.C.

(57) ABSTRACT

Unmanned missile and method for releasing the unmanned missile from a carrier aircraft, in which the missile has an autonomous flight control device that acts on control devices of the missile. The method includes adjusting vertical rudders and elevators of the missile into a neutral position in which a respective rudder angle is 0°, separating electrical and mechanical connections between the missile and the carrier aircraft, and detecting, via sensors of the missile, that the separating has occurred. The method also includes activating the autonomous flight control device and automatically controlling the missile with the flight control device and the control devices based upon correction flight condition variables caused by a prevailing downwash between the missile and the carrier aircraft, and automatically controlling the missile with the flight control device and the control devices based on data stored in at least one storage device on the missile.

17 Claims, 3 Drawing Sheets

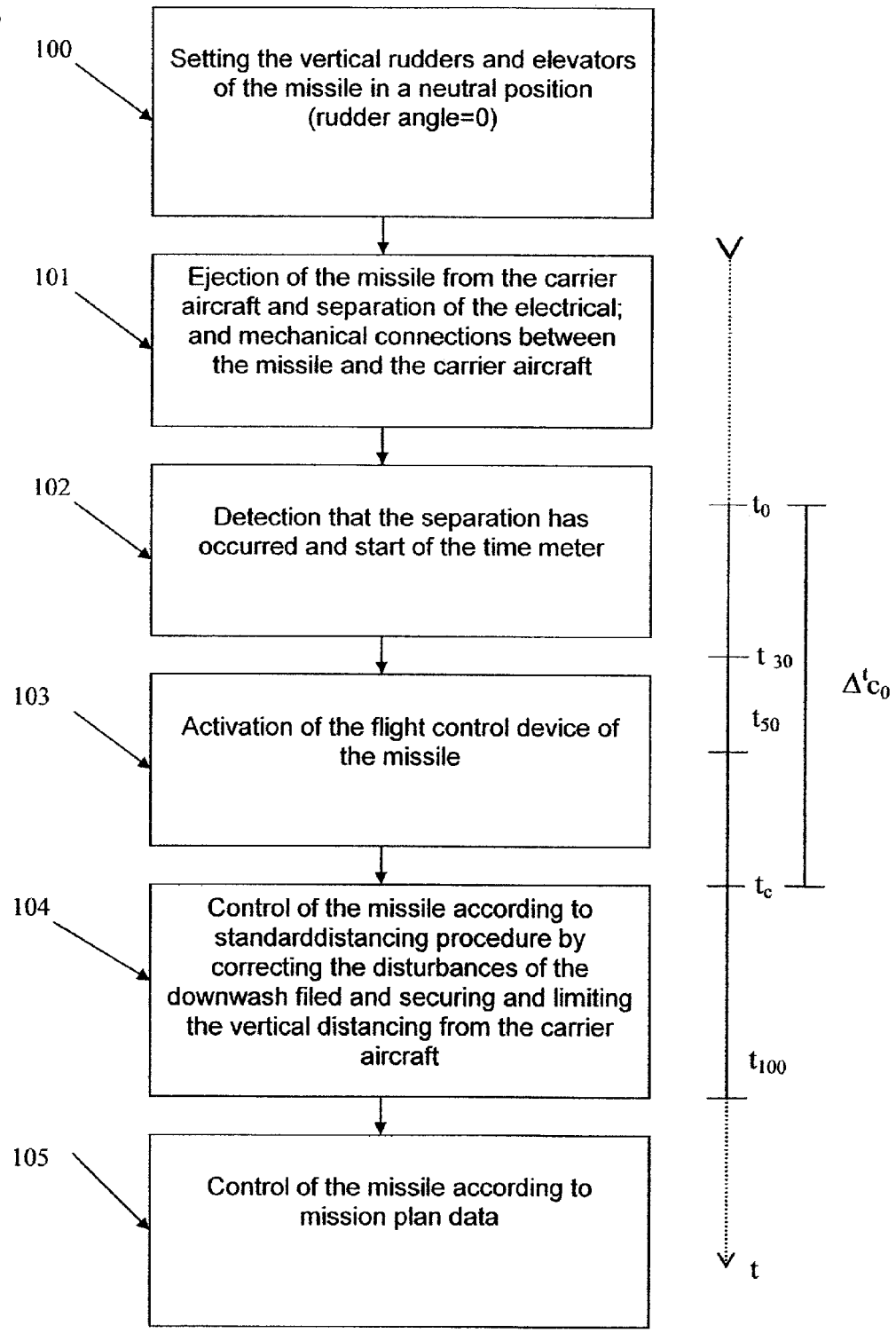

METHOD FOR RELEASING AN UNMANNED MISSILE FROM A CARRIER AIRCRAFT

The present application claims priority under 35 U.S.C. §119 of German Patent Application No. 10 2008 034 618.7 filed Jul. 25, 2008, the disclosure of which is expressly incorporated by reference herein in its entirety.

BACKGROUND OF THE INVENTION

1. Field of the Invention

The present invention relates to a method for releasing an unmanned missile from a carrier aircraft. In particular the invention relates to a method for releasing an unmanned, aerodynamically unstable missile from a carrier aircraft.

2. Discussion of Background Information

Although conventional unmanned missiles, for example so-called "cruise missiles," are provided with their own wings as uplift aids, these wings in carried flight, i.e., when the missile is attached to the carrier aircraft, are in a retracted position within the contour of the missile, and are not extended until after the missile is released. The missile is thus in an aerodynamically unstable state directly after the release from the carrier aircraft. The aerodynamic stability (above all in the pitch axis) does not improve substantially until the wings have been extended.

In the release of an unmanned missile attached to a so-called pylon on the carrier aircraft, it should be ensured that the unmanned missile is not immediately deflected after its release by aerodynamic forces, for example, by the so-called downwash field (i.e., the flow field around the missile in the attached state) and through repulsive forces of an ejector system (e.g., a gas pressure system) provided on the pylon. Such an immediate deflection can result in the unmanned missile colliding with the carrier aircraft or getting into a flight condition that can no longer be controlled.

The aerodynamic forces acting on the missile are dependent on the velocity of approach, i.e., on the tape-to-head speed of the carrier aircraft to the air upon release of the unmanned missile, on the atmospheric density, i.e., the flight altitude at which the release occurs, on the angle of incidence of the missile and on the aerodynamic flow conditions, i.e., the downwash field, of the unmanned missile attached to the carrier aircraft. This downwash field, which is different from an airflow around the missile in the free air field, results from flow bottlenecks (e.g., through containers on adjacent weapon stations or through restriction of the space between a missile and an underside of the carrier aircraft by a pitch angle offset provided during the installation of the missile) and/or from fluid-flow stagnation areas (e.g., on the front root of the pylon). In this way, static and dynamic pressure differences and thus special actions of forces and moments on the missile result, which disappear again with increasing distance from the carrier aircraft during release, typically occur approximately 200 ms after the release. Subsequently the aerodynamics of the free air flow acts on the missile.

Pressure differences between the top and underside of the missile generate pitching moments and pressure differences between the left and the right side of the missile generate yawing moments. Typically, negligible moments about the yaw axis and about the roll axis result at wing weapon stations with sufficient distance from adjacent containers. However, a dominating pitching moment results, which presses the missile nose downwards and the strength of which depends on the angle of incidence of the missile, on the Mach number and on the atmospheric density. This pitching moment already acts on the missile in the attached state and during the release exerts a more or less strong angular momentum about the pitch axis on the missile. This specific rotational effect disappears during the release operation with increasing distance of the missile from the carrier aircraft, because the pressure differences between the top and underside balance one another. Since in this situation the missile has hardly any aerodynamic pitch stability, the rotational motion about the pitch axis caused by the pitching moment continues. The pitch rotation rate greatly increases due to the increasing area of the missile, which is exposed to the dynamic pressure of the approach flow, and which results above all when the aerodynamic center of pressure is located ahead of the center of gravity (nose is at the front). Then a flight attitude of the missile very quickly occurs thereby which can no longer be stabilized, so that the released unmanned missile crashes out of control and is lost for the planned mission, unless corresponding countermeasures are initiated promptly.

Immediately after the release, the unmanned missile is subjected to a pitching moment due to the aerodynamic forces acting on it, which pitching moment presses the nose of the missile downwards that can result in the missile being in an uncontrolled vertical flight attitude. This flight attitude can no longer be stabilized even after the wings have been extended, so that the released unmanned missile crashes out of control and is lost for the planned mission.

The release of a missile from the carrier aircraft is carried out in a state of the missile in which the flight attitude control thereof has not yet been activated. This is thereby intended to avoid a collision between the missile and the carrier aircraft occurring in the immediate vicinity of the carrier aircraft through an error in the flight attitude control of the unmanned missile. For this reason, different approaches have hitherto been preferred.

Since the missile is aerodynamically stable and inactive during the carried flight, i.e., without its own power supply, it is connected to the carrier aircraft by a release cord in addition to the mechanical fastening device. The release cord activates the power supply of the missile after the release of the missile at a specific distance of the missile from the carrier aircraft, so that the flight attitude control of the missile cannot be operable until then. Only missiles with sufficiently large aerodynamic stability or with restricted release conditions with respect to angle of incidence, Mach number and altitude can be used for this method, so that a loss of the missile through the downwash field acting until the start of its own flight control is ruled out.

In an alternative approach, the power system of the aerodynamically stable missile is already active during the carried flight. However, for safety reasons, the activation of the flight attitude control of the missile is delayed via corresponding time-delay devices in the missile and the control surface deflection of the control surfaces is limited for a specific time until the missile is sufficiently far away from the carrier aircraft. During the phase of the unregulated flight between the release and the start of the flight attitude control of the missile, there is no risk of loss here either through the aerodynamic forces acting thereon because of the aerodynamic stability of the missile.

However, if the missile is aerodynamically unstable, at least in the first flight phase after the release, and if relevant forces and moments of the downwash field act on the missile, there is a risk that it will get into an unstable flight attitude in the time between the release and the start of the missile flight attitude control and will therefore be lost. However, the safety philosophy has hitherto required that the flight attitude control of the missile can be active only when it has been ensured that a faulty flight attitude control will not lead to a collision of the missile with the carrier. In practice, this period of time for aerodynamically unstable missiles has hitherto not been less than 100 ms after release from the carrier aircraft has been detected.

In the case of aerodynamically unstable missiles, the vertical rudders and elevators provided on the tail of the unmanned missile have hitherto been brought from the neutral position (rudder angle=0°) into a deflected rudder position (so-called "fin preset") shortly before the release of the missile from the carrier aircraft. In this manner, moments result to the missile center of gravity through the approach flow of the rudder and through the lever arms of the rudders which are opposed to the moments of the downwash field acting on the missile and thus correspondingly suppress the rotary motion of the missile during release.

Since the forces and moments acting on the missile due to the downwash are essentially dependent on the flight altitude and on the airspeed of the carrier aircraft, the preset rudder angles of the elevators/vertical rudders have to be adjusted to the approach flow conditions, i.e., to the airspeed and the flight altitude. In order to determine these rudder angles, it is therefore necessary to carry out a multiplicity of flight tests and computational fluid dynamics (CFD) simulations. These flight tests and simulations have to be carried out not only for each combination of a carrier aircraft model and missile model, but in addition also for each attachment location of the unmanned missile on the carrier aircraft (for example, under the fuselage or under the wings) and for each combination of the configuration of adjacent stations for the attachment of weapons and containers. Furthermore, the presetting of the rudder angles of the missiles has to be determined anew with the introduction of new weapons or containers at adjacent stations, since the new adjacent configuration changes the downwash field of the missile and since the resulting rotary and translational effects on the missile therefore change. This shows that a huge expenditure in terms of preliminary tests and simulations has to be invested before the clearance for use of a combination of carrier aircraft and unmanned missile.

SUMMARY OF THE INVENTION

The embodiments of the present invention provide a method for releasing an unmanned missile from a carrier aircraft, which functions reliably even when the unmanned missile is aerodynamically unstable, at least during the release from the carrier aircraft. Further, in accordance with the invention, the expenditure for flight clearance of the combination of carrier aircraft and unmanned missile is substantially reduced.

Embodiments of the invention are directed to a method for releasing an unmanned missile from a carrier aircraft. The missile has an autonomous flight control device that acts on control devices of the missile, and the method includes:

a) Adjustment of the vertical rudders and elevators of the missile into a neutral position in which the respective rudder angle is 0°, b) Separation of the electrical and mechanical connections between the missile and the carrier aircraft;

c) Detection, by sensors of the missile, that the separation has occurred;

d) Activation of the flight control device of the missile and automatic control of the missile by the flight control device and the control devices of the missile on the basis of the correction of flight condition variables that are caused by the downwash prevailing between the missile and the carrier aircraft; and e) Automatic control of the missile by the flight control device and the control devices of the missile on the basis of data stored in at least one storage device of the missile, in particular data of a distancing procedure and flight path data.

The missile is thereby controlled through the downwash field such that it adopts only flight conditions that rule out making contact with the carrier aircraft and make the intended mission feasible.

In the case of an extremely strong downwash field (high Mach number, low altitude, negative angle of incidence of the missile), the flight control must start as directly as possible after release is detected, since there is no counteraction from the preset rudders, and in order to achieve a smooth transition from the uncontrolled to the controlled flight condition, for example, to avoid maximum control outputs or control surface deflections. However, this has to wait until the translational effect of the repulsive forces of the pylon ejector system has subsided, e.g., approximately 30 to 60 ms after the physical release.

The inventors recognized that, due to the high reliability of current control systems, safety is not impaired during the separation of the unmanned missile from the carrier aircraft and in the flight phase immediately thereafter, if the on-board flight control of the missile already starts at a very early point after the separation, i.e., much earlier than has hitherto been provided in the prior art. The inventors have thereby overcome the deficiencies in the prior art that the missile flight control must not start until the unmanned missile has reached a time interval from the carrier aircraft of greater than 100 ms during the release operation. Another deficiency of the prior art overcome by embodiments of the invention is the previously held belief that the flight control must not start until after the effects of the downwash field have disappeared, if only a rough idea of the effects of the downwash field is known (e.g., the maximum occurring pitching moment) or only at specific operating points of the operational release range.

In accordance with embodiments of the invention, it is no longer necessary to already act on the control devices of a missile with a preset rudder angle (preset) before the release. The expensive preliminary tests (flight tests, simulations) described at the outset for determining the suitable rudder angles depending on the flight altitude, the airspeed, the angle of incidence and the structurally determined flow situation at the location of the attachment of the missile to the carrier aircraft are thus also unnecessary.

Another advantage results through the early start of flight control according to the invention in that the effect of the downwash field needs to be determined only at a few operating points, preferably at the limits of the operational field conditions (angle of incidence, Mach number, altitude) by real uncontrolled drops of the missile from the carrier aircraft, so-called jettison drops, and preceding computational simulations in terms of fluid mechanics. In this way, it can then likewise be determined and verified through simulations in which the real measured effects of the downwash field (forces, moments) are reproduced, whether the flight control can adequately counteract the rotational effects of the downwash field (only pitch rotational rates or pitch/yaw rotational rates).

Moreover, a control device is more suitable for counteracting unforeseen disturbances than preset rudders that generate only a specific countermoment.

The autonomous flight control of the missile in step d) preferably starts at a point in time ($t_C$) that is no later than 100 ms after the start of a time meter at a point in time ($t_0$) of the detection of the separation.

The control devices of the missile in step d) are preferably not activated for the purpose of controlling the missile before the occurrence of the separation has been detected.

Preferably, the activation of the flight control device in step d) takes place such that the point in time ($t_C$), at which the autonomous flight control of the missile starts, lies in a time range of no earlier than 30 ms after the start of the time meter. Providing this interval between the detection of the separation having occurred at point in time ($t_0$) and the point in time ($t_C$) at which autonomous flight control starts, has the advantage that the translational repulsive forces of the ejector system acting on the missile during the mechanical release of the missile from the carrier aircraft can act freely until they diminish, without the flight control of the missile operating against these repulsive forces. The step of mechanical separation can thus be carried out unhindered.

In a particularly preferred embodiment of the method according to the invention, the activation of the flight control device in step d) is carried out such that the point in time ($t_C$), at which the autonomous flight control of the missile starts, lies in a time window of between 50 ms and 100 ms after the start of the time meter. This time window has proven to be particularly advantageous for the start of the flight control of aerodynamically unstable missiles, in particular with regard to the smooth transition from uncontrolled to controlled flight conditions of the missile.

Preferably the point in time ($t_C$), at which the autonomous flight control of the missile starts, is dependent on the airspeed ($V_R$, the Mach number or the equivalent air speed (EAS)) of the carrier aircraft during the separation of the missile from the carrier aircraft in step b). This further development permits an even better adjustment of the point in time at which the flight control starts to the respective operating conditions at the time of the release. The EAS is defined as the speed at sea level that would produce the same incompressible dynamic pressure as the true airspeed at the altitude at which the respective vehicle (i.e., the missile) is flying.

Preferably the time difference ($\Delta t_{e0}$) between the point in time ($t_0$) of the detection of the separation and the point in time ($t_C$) at which the autonomous flight control of the missile starts decreases with increasing airspeed (VR). The faster the carrier aircraft is flying at the time of release, the sooner the flight control of the missile starts. In this way, the transition of the missile into a stable flight condition after the release is even better ensured.

Further preferably, the time ($t_C$), at which the autonomous flight control of the missile starts, is dependent on the flight altitude ($H_R$) of the carrier aircraft or on the prevailing static pressure during the separation of the missile from the carrier aircraft in step d). This further development permits an even better adjustment of the point in time at which the flight control starts to the respective operating conditions at the point in time of release, in particular to the atmospheric density prevailing at the location of release.

Even further preferably, the time difference ($\Delta t_{C0}$) between the point in time ($t_0$) of the detection of the separation and the point in time ($t_C$), at which the autonomous flight control of the missile starts, is shorter, the lower the flight altitude ($H_R$) or the greater the prevailing static pressure. The lower the carrier aircraft is flying at the point in time of release, the earlier the flight control of the missile therefore starts, whereby the transition of the missile into a stable flight condition after the release is even better ensured.

It is also particularly advantageous if step e) is carried out in the following two partial steps:
e1) Automatic control of the missile by the flight control device and the control devices of the missile on the basis of data of a standard distancing procedure stored in the storage device of the missile; and
e2) Automatic control of the missile by the flight control device and the control devices of the missile on the basis of mission data stored in the storage device of the missile.

It is achieved through these two partial steps in conjunction with step d) that the missile initially and for a short time (approximately 1 to 2 seconds) counteracts the disturbances of the downwash field (step d), for example, pitch rotation rate=0°/sec and transverse acceleration=0 m/sec², to maintain the roll angle upon release. The missile is then guided away from the carrier aircraft in a controlled manner (see step e1: standard distancing procedure), preferably approximately 1.5 to 2.5 seconds before the actual control of the flight attitude for controlling the missile according to a stored mission plan starts (see step e2). This standard distancing procedure can thereby be characterized such that the control of the vertical speed and thus the limitation of the vertical distance of the missile from the carrier aircraft is carried out according to a desired profile.

It is advantageous thereby if step e2) does not take place until after the distancing procedure of step e1) has been completed.

Embodiments of the invention are directed to a method for releasing an unmanned missile from a carrier aircraft, in which the missile has an autonomous flight control device that acts on control devices of the missile. The method includes adjusting vertical rudders and elevators of the missile into a neutral position in which a respective rudder angle is 0°, separating electrical and mechanical connections between the missile and the carrier aircraft, and detecting, via sensors of the missile, that the separating has occurred. The method also includes activating the autonomous flight control device and automatically controlling the missile with the flight control device and the control devices based upon correction flight condition variables caused by a prevailing downwash between the missile and the carrier aircraft, and automatically controlling the missile with the flight control device and the control devices based on data stored in at least one storage device on the missile.

According to embodiments, in the activating of the flight control, the autonomous flight control of the missile can be activated to start at a point in time that is no later than 100 ms after the start of a time meter at a point in time when the occurrence of separation is detected.

In accordance with further embodiments, in the activating of the flight control, the control devices are not activated for controlling the missile before the occurrence of separation has been detected.

According to other embodiments of the invention, in the activating of the flight control, the activation of the flight control device can take place such that a point in time, at which the autonomous flight control of the missile starts, is within a time range of no earlier than 30 ms after the start of the time meter.

In accordance still other embodiments of the instant invention, in the activating of the flight control, the flight control device can be activated at a point in time that is within a time window of between 50 ms and 100 ms after the start of the time meter.

Further, the point in time at which the autonomous flight control starts may depend on airspeed of the carrier aircraft during the separating of the electrical and mechanical. A time difference between the detected point in time of the occurrence of the separation and a point in time at which the autonomous flight control of the missile starts can decrease with increasing airspeed.

A time at which the autonomous flight control of the missile starts can depend on a flight altitude of the carrier aircraft during the occurrence of the electrical and mechanical separation of the missile from the carrier aircraft. A time difference between a point in time of the detection of the occurrence of the separation and the point in time, at which the autonomous flight control of the missile starts, may become shorter as the flight altitude is lowered.

Moreover, the automatically controlling can include automatically controlling the missile by the flight control device and the control devices based upon data of a standard distancing procedure stored in a storage device of the missile, and automatically controlling the missile by the flight control device and the control devices based upon mission data stored in the storage device of the missile. The automatic controlling of the missile based upon stored mission data is not carried out until the distancing procedure has been completed.

According to further embodiments of the present invention, the neutral position into which the vertical rudders and elevators of the missile are adjusted have a respective rudder angle of 0°.

Embodiments of the instant invention are directed to an unmanned missile releasable from a carrier aircraft. The unmanned missile includes control devices, vertical rudders and elevators positionable into a neutral position, at least one holding device engageable with a counterholding device on at least one of the carrier aircraft or a pylon of the carrier aircraft, and separation detectors structured and arranged to detect at least one of an electrical and mechanical separation of the at least one holding device from the counterholding device. A timer is structured and arranged to start upon detection of the at least one of the electrical and mechanical separation, and an avionic system includes a flight control device and a storage device. The flight control device is activatable within 100 ms after the timer starts to act on the control devices to correct flight condition variables caused by a prevailing downwash after the separation, and the storage device stores data readable by the flight control device to control the control devices.

According to embodiments of the invention, before the timer starts, the flight control device may not control the control devices.

In accordance with embodiments, the flight control device may not activatable earlier than 30 ms after the timer starts.

The flight control device can be activatable within a time window between 50 ms and 100 ms after the start of the time meter.

According to other embodiments of the present invention, the storage device can store data for completing a distancing procedure and mission data. The flight control device may control the control devices in accordance with the mission data after the distancing procedure is completed.

Embodiments of the invention are directed to a method for releasing an missile from a carrier aircraft, in which the missile has control devices and an autonomous flight control device that acts on the control devices. The method includes adjusting vertical rudders and elevators of the missile into a position in which a respective rudder angle is 0°, separating at least one of an electrical and a mechanical connection between the missile and the carrier aircraft, starting a timer upon detecting the separating, and activating the flight control device within 100 ms of the timer starting to control the missile based upon correction flight condition variables caused by a prevailing downwash between the missile and the carrier aircraft after separating.

In accordance with still yet other embodiments of the present invention, the flight control device may not activated earlier than 30 ms after the start of the timer.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 illustrates a flow chart of a preferred embodiment of the method according to the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
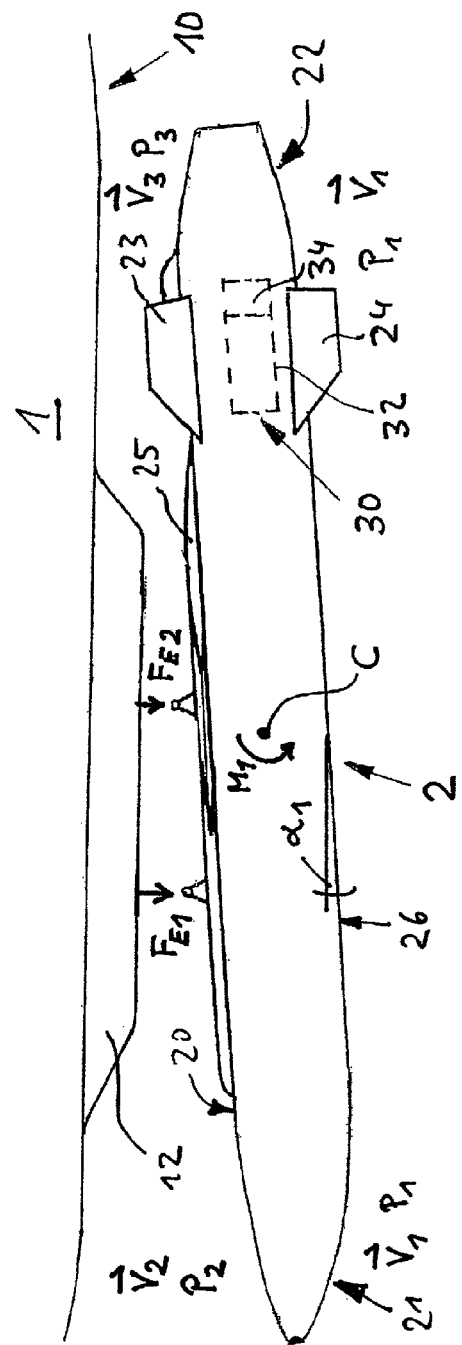
FIG. 1 diagrammatically illustrates an unmanned missile at the point in time of the separation from the carrier aircraft at a small angle of incidence of the carrier aircraft.
Figure 1:
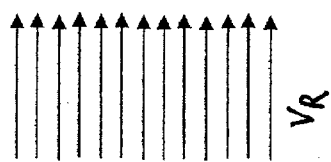

FIG. 1 is a diagrammatic representation of the fuselage underside 10 of a carrier aircraft 1 and an unmanned missile 2. The figure shows a condition in which missile 2 has just been separated in a known manner from carrier aircraft 1 and at a point in time after separation, e.g., when the missile has been pushed away from carrier aircraft 1 by two ejectors in an area where missile 2 was suspended from carrier aircraft 1. The action of force of the ejectors is shown symbolically by arrows $F_{E1}$ and $F_{E2}$.

Aircraft 1 has a bomb pylon 12 on the fuselage side 10 or on an underside of a wing. Bomb pylon 12 is embodied or formed in a partially open manner on the underside and, in the interior of bomb pylon 12, two detachable holding devices are provided. In carried flight, the detachable holding devices can engage with two corresponding counter-holding devices that project from an upper carrier element of missile 2 in order to attach missile 2 to carrier aircraft 1. An electrical connector is also provided in the area of the open underside of bomb pylon 12 to mechanically and electrically connect to a mating connector on a top 20 of missile 2.

Missile 2 is provided with an avionic system 30, shown only diagrammatically in the figures, which among other things has a flight control device 32 and a storage device 34 for flight path data. A tail 22 of missile 2 is provided with preferably four pivotable control surfaces 23, 24 that are uniformly spaced apart from one another over a circumference and that can be acted on by flight control device 32. Two wings 25, which can be laterally swiveled out, are attached to the top 20 of missile 2 in order to provide missile 2 with improved gliding properties. Wings 25 are not extended in carried flight, but instead lie on the top 20 of missile 2 and either do not project laterally or project only slightly beyond the contour of the missile body. Missile 2 is aerodynamically unstable because the wings 25 are unextended. Missile 2 is not given a relevant aerodynamic stability, above all about the pitch axis, until the wings 25 are swiveled out.

FIG. 1 shows the air flowing towards the carrier aircraft 1 and the unmanned missile 2 by a multiplicity of parallel horizontal arrows. The flow velocity of this air in front of the unmanned missile corresponds to the velocity $V_R$ of the carrier aircraft 1 at the point in time of the separation.

It becomes clear that, at the point in time of the release, missile 2 adopts a negative angle of incidence $\alpha_1$, with respect to carrier aircraft 1, due to the attachment, so that the distance between underside 10 of aircraft 1 and the top 20 of unmanned missile 2 is greater in the area of nose 21 (i.e., on the left in FIG. 1) than in the area of tail 22 thereof. The air flowing towards missile 2 is thus accelerated between the top 20 of missile 2 and underside 10 of carrier aircraft 1, since the flow space between missile 2 and carrier aircraft 1 narrows from nose 21 to tail 22. Flow velocity $V_2$ above nose 21 of missile 2 is already accelerated here compared to the velocity of approach $V_R$. The approaching air is further accelerated from nose 21 towards tail 22 and there reaches the higher flow velocity $V_3$ compared to flow velocity $V_2$. The following applies: $V_3 > V_2 > V_R$. Since missile 2 can be freely flowed around on underside 26 thereof, flow velocity $V_1$ on underside 26 of missile 2, which remains essentially constant from nose 21 to tail 22, corresponds to the velocity of approach $V_R$.

This flow around unmanned missile 2 at the point in time of the separation from carrier aircraft 1 means that a static pressure $P_2$ above nose 21 is greater than the static pressure $P_3$ at the tail 22. Since the static pressure $P_1$ on underside 26 of the missile 2 is constant over its entire length, due to the constant flow velocity $V_1$, a pitching moment $M_1$ results that rotates nose 21 downwards. Thus, the following applies to the static pressure: $P_1 > P_2 > P_3$. The pressure difference between $P_1$ and $P_3$ is therefore greater than the pressure difference between $P_1$ and $P_2$, such that: $(P_1-P_3) > (P_1-P_2)$. Pitching moment $M_1$ has a tendency to press nose 21 of missile 2 downwards. In addition, there is a dynamic pressure force directed downwards caused by the dynamic pressure of the flow acting on tilted top 20 of missile 2. Thus, at the moment of release, missile 2 is rotated counter-clockwise during its descending motion, due to gravity and the forces exerted by the ejectors in the diagram of FIG. 1.

Figure 2:
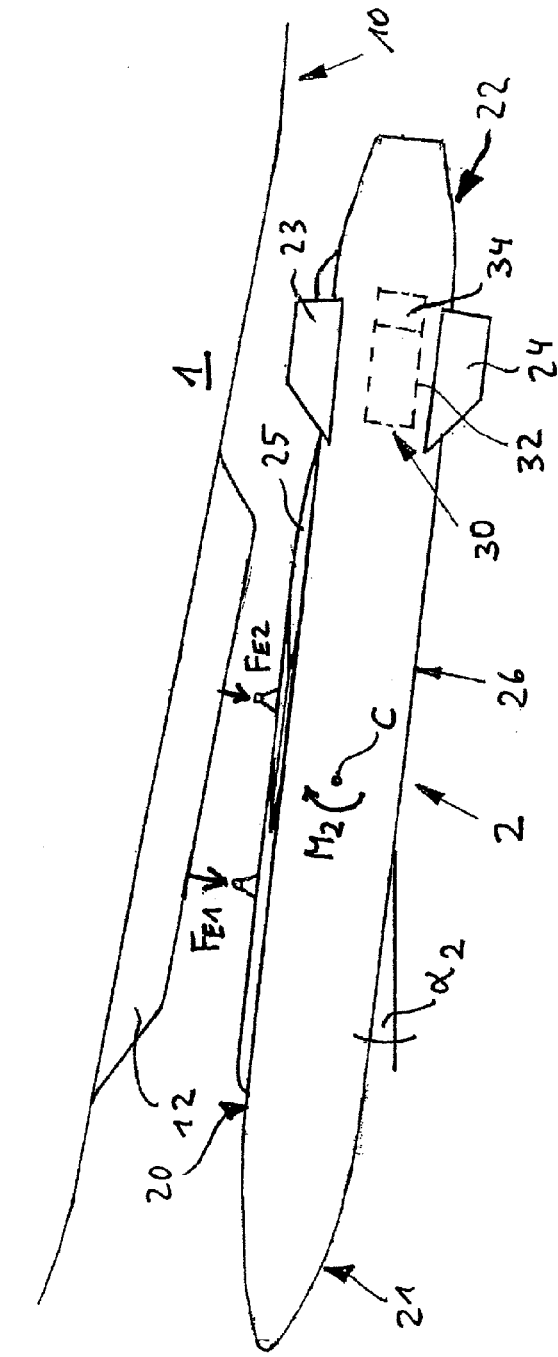
FIG. 2 diagrammatically illustrates an unmanned missile at the point in time of the separation from the carrier aircraft at a steeper angle of incidence of the carrier aircraft.
Figure 2:
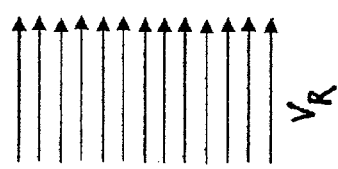

FIG. 2 shows the same arrangement of missile 2, i.e., shortly after separation from carrier aircraft 1, as shown in FIG. 1, but in the flight attitude that adopts a steeper angle of incidence so that the approach flow to missile 2 is at a positive angle of incidence $\alpha_2$ at velocity $V_R$. This angled approach flow results in an additional uplift component through the dynamic pressure acting on underside 26 of missile 2. This results in a moment $M_2$, which acts clockwise on missile 2 in the representation shown in FIG. 2 and has the tendency to press nose 21 of missile 2 upwards. In the flight attitude shown in FIG. 2, missile 2 will thus rotate clockwise after the separation from carrier aircraft 1 and point the nose upwards, as it drops down.

Figure 3:
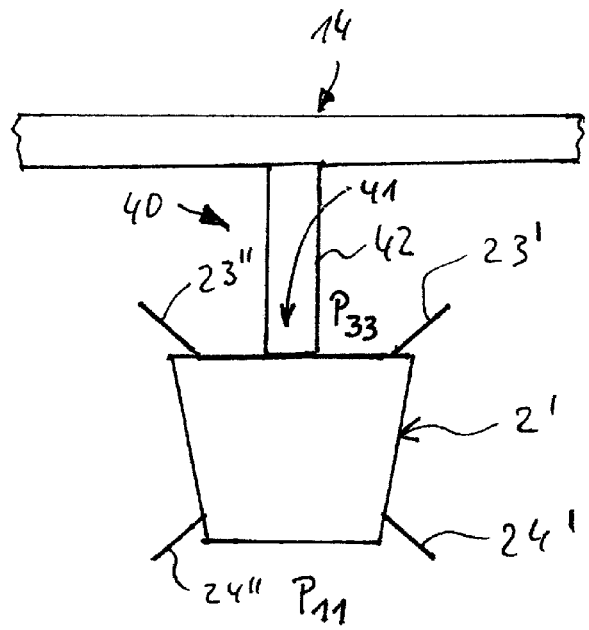
FIG. 3 diagrammatically illustrates a front view of an unmanned missile attached under a wing of the carrier aircraft before the separation from the carrier aircraft.

FIG. 3 shows a diagrammatic front view of an unmanned missile 2' attached on a wing weapon station 40 under a wing 14 of carrier aircraft 1 before separation from carrier aircraft 1. Control devices (rudders) 23', 23", 24', 24" adopt a neutral position. A wing weapon station 40 has a pylon 42 on which missile 2' is attached. Since the approach air flow backs up at root 41 of pylon 42, the dynamic pressure $P_{33}$ above missile 2' is greater than the static pressure $P_{11}$ below missile 2'. Missile 2' is therefore subjected to a downward action of force. With the dynamic pressures, the conditions according to Bernoulli's principle are inverted.

Figure 4:
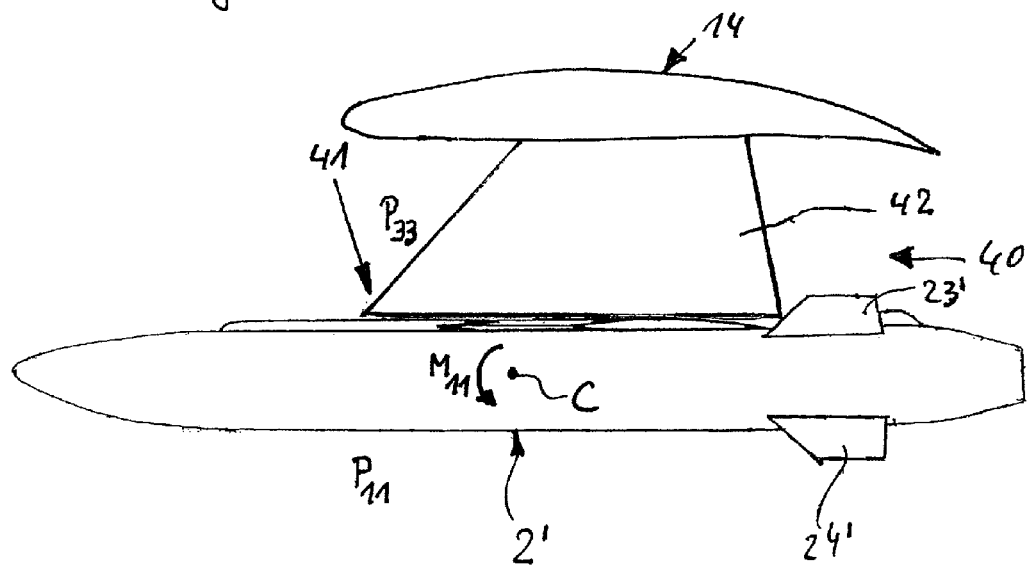
FIG. 4 diagrammatically illustrates a side view of an unmanned missile attached under a wing of the carrier aircraft before the separation from the carrier aircraft.

FIG. 4 shows a diagrammatic side view of the unmanned missile 2' attached under the wing 14 of the carrier aircraft 1 before the separation from the carrier aircraft 1. Due to the conditions of the static pressures $P_{11}$ and $P_{33}$ described above and pressure $P_{33}$, acting on missile 2' due to the arrangement of the missile 2' displaced forwards on pylon 42 mainly in front of the center of gravity C of missile 2', missile 2' is subjected to a pitching moment $M_{11}$ pressing the nose downwards, in a so-called "pitch-down torque."

The higher the velocity (Mach number) and the denser the air, the greater the pitch-down torque. Typically, it decreases with a positively increasing angle of incidence (nose upwards) of the missile, because the center of pressure (application point of the resulting aerodynamic force) shifts towards the center of gravity C of missile 2'. In this manner, the acting lever arm becomes increasingly smaller and resulting moment $M_{11}$ reaches zero. In the case of an unstable missile, it is then increasingly uncertain in which direction it will rotate upon discharge. For safety reasons, a rotation with the nose downwards is always desirable. In a rotation with the nose upwards, the missile would strike the pylon.

As a condition for the permitted release (operational release envelope) for carrier aircraft 1, the angle of incidence of carrier aircraft 1 is therefore always selected such that the angle of incidence of missile T during release is not greater than +1° to 2°. The missile is attached to wing 14 with a pitch angle offset of, e.g., −3°. The higher the velocity, the smaller the angle of incidence of carrier aircraft 1. In this way, negative missile angles of incidence can result, which intensifies the rotation of the missile downwards through the dynamic pressure acting increasingly on the top of missile 2'. Positive angles of incidence mean the nose points upwards, while negative angles of incidence mean the nose points downwards.

The pitch-down moment $M_1$ acting on the missile 2 in the flight attitude in FIG. 1 or in FIG. 3 and FIG. 4, as well as the pitch-up moment $M_2$ acting on the missile 2 in the flight attitude of FIG. 2, bring the missile 2 into an unstable flight attitude (either with the nose downwards, as in FIG. 1 or with the nose upwards, as in FIG. 2), unless control measures of the missile 2 are performed promptly which counteract the corresponding moment $M_1$ or $M_2$.

FIG. 5 shows a particularly suitable example of the method according to the invention, by which missile 2 is prevented from reaching one of the referenced unstable flight attitudes.

At first in step 100, the vertical rudders and elevators of the missile are unlocked, subjected to a brief movement test and then moved into a neutral position (rudder angle=0°), so that the approaching air cannot exert any action of force or moment on the missile immediately before the release operation.

Then in step 101, missile 2 is ejected from carrier aircraft 1, which results in the separation of the electrical and mechanical connections between missile 2 and carrier aircraft 1. Once the mechanical separation between missile 2 and carrier aircraft 1 and/or the electrical separation has occurred, this separation is determined or detected by sensors of missile 2 in step 102. At point in time $t_0$, the time at which the separation is detected, a time meter in the on-board computer of missile 2 is started. The point in time $t_0$ is shown in FIG. 5 on a time bar t.

In step 103, the activation of flight control device 32 of missile 2 is carried out such that the autonomous flight control of the missile starts at a point in time $t_C$ which is not later than 100 ms (milliseconds) after the start of the time meter at point in time $t_0$.

It is preferably taken into consideration thereby that a slight time delay until the start of the autonomous flight control is useful in order not to impede the operation of the ejection of missile 2 from carrier aircraft 1 by immediate counteraction by flight control device 32. The autonomous flight control of missile 2 therefore does not start at the soonest until about 30 ms ($t_{30}$) to 50 ms ($t_{50}$) after the start of the time meter at point in time $t_0$. The automatic flight control thus starts at point in time $t_C$ in step 104 on the basis of an algorithmic system which initially counteracts the disturbing moments of the downwash field, in order to minimize the change of the flight attitude of missile 2 due to the downwash field. Typically, the pitch rotation rate is controlled at 0°/sec in order to counteract the pitching moment, the transverse acceleration is corrected to 0 m/sec² (the sensor is located in the nose) in order to eliminate any induced rotations about the yaw axis. Furthermore, a roll control is active, which tries to prevent the changes in the roll angle of missile 2. This control, specifically directed against the actions of the downwash field, is typically maintained for one to two seconds after the release.

Subsequently, a flight condition control is usually carried out for 1.5 to 2.5 seconds, which ensures the safe, vertical distancing of missile 2 from carrier aircraft 1 and which avoids an excessive dropdown by missile 2, e.g., through the control of the vertical velocity according to a predetermined desired profile.

Step 104 can also be carried out in two partial steps:
- Automatic control of missile 2 by the flight control devices and the control devices of missile 2 on the basis of the correction of flight attitude changes that are caused by the downwash field prevailing between missile and carrier aircraft; and
- Automatic control of the missile by the flight control devices and the control devices of missile 2 on the basis of data of a standard distancing procedure stored in a storage system of the missile.

In a subsequent step 105, the control of missile 2 is then carried out by flight control device 32 and control devices 23, 24 of missile 2 on the basis of flight path data of a mission to be currently flown stored in storage system 34 of missile 2.

The time difference $\Delta t_{C0}$ between point in time $t_0$ of the detection of separation and point in time $t_C$ at which the autonomous flight control of missile 2 starts, decreases with increasing airspeed $V_R$ of carrier aircraft 1 at the point in time of the release. Moreover, time difference $\Delta t_{C0}$ is shorter, the lower the flight altitude HR at the point in time of the release.

The invention is not limited to the above exemplary embodiment, which is used only for the general explanation of the basic concept of the invention. In fact, within the scope of the patent, the device according to the invention can also include other embodiments than those described above. The device can hereby in particular have features that represent a combination of the respective individual features of the claims.

Reference numbers in the claims, the specification and the drawings are used only for better understanding of the invention and are not intended to restrict the extent of protection.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

| List of Reference Numbers | |
| --- | --- |
| 1 | Carrier aircraft |
| 2 | Missile |
| 2' | Unmanned missile |
| 10 | Fuselage underside |
| 12 | Bomb pylon |
| 14 | Carrier aircraft wing |
| 20 | Missile top |
| 21 | Missile nose |
| 22 | Missile tail |
| 23 | Missile control surface |
| 24 | Missile control surface |
| 25 | Missile wings |
| 26 | Missile underside |
| 30 | Avionic system |
| 32 | Flight control device |
| 40 | Wing weapon stations |
| 42 | Pylon |
| C | Center of gravity |
| $H_R$ | Flight altitude |
| $M_1, M_2, M_{11}$ | Moment |
| $P_1$-$P_3$ | Static pressure |
| $P_{11}, P_{33}$ | Static pressure |
| $t_0, t_C, T_{30}, t_{50}$ | Point in time |
| $V_1$-$V_3$ | Flow velocity |
| $V_R$ | Velocity of approach |
| $\alpha_R$ | Angle of incidence |
| $\Delta t_{C0}$ | Time difference |

What is claimed:

1. The method for releasing an unmanned missile from a carrier aircraft, the missile having an autonomous flight control device that acts on control devices of the missile, the method comprising:
   adjusting vertical rudders and elevators of the missile into a neutral position in which a respective rudder angle is 0°;
   separating electrical and mechanical connections between the missile and the carrier aircraft;
   detecting, via sensors of the missile, that the separating has occurred;
   activating the autonomous flight control device and automatically controlling the missile with the flight control device and the control devices based upon correction flight condition variables caused by a prevailing downwash between the missile and the carrier aircraft; and
   automatically controlling the missile with the flight control device and the control devices based on data stored in at least one storage device on the missile, wherein, in the activating of the flight control, the autonomous flight control of the missile is activated to start at a point in time that is no later than 100 ms after the start of a time meter at a point in time when the occurrence of separation is detected.

2. The method for releasing an unmanned missile from a carrier aircraft, the missile having an autonomous flight control device that acts on control devices of the missile, the method comprising:
adjusting vertical rudders and elevators of the missile into a neutral position in which a respective rudder angle is 0°;
separating electrical and mechanical connections between the missile and the carrier aircraft;
detecting, via sensors of the missile, that the separating has occurred;
activating the autonomous flight control device and automatically controlling the missile with the flight control device and the control devices based upon correction flight condition variables caused by a prevailing downwash between the missile and the carrier aircraft; and
automatically controlling the missile with the flight control device and the control devices based on data stored in at least one storage device on the missile,
wherein, in the activating of the flight control, the activation of the flight control device takes place such that a point in time, at which the autonomous flight control of the missile starts, is within a time range of no earlier than 30 ms after the start of a time meter.

3. The method for releasing an unmanned missile from a carrier aircraft, the missile having an autonomous flight control device that acts on control devices of the missile, the method comprising:
adjusting vertical rudders and elevators of the missile into a neutral position in which a respective rudder angle is 0°;
separating electrical and mechanical connections between the missile and the carrier aircraft;
detecting, via sensors of the missile, that the separating has occurred;
activating the autonomous flight control device and automatically controlling the missile with the flight control device and the control devices based upon correction flight condition variables caused by a prevailing downwash between the missile and the carrier aircraft; and
automatically controlling the missile with the flight control device and the control devices based on data stored in at least one storage device on the missile,
wherein, in the activating of the flight control, the flight control device is activated at a point in time that is within a time window of between 50 ms and 100 ms after the start of a time meter.

4. The method for releasing an unmanned missile from a carrier aircraft, the missile having an autonomous flight control device that acts on control devices of the missile, the method comprising:
adjusting vertical rudders and elevators of the missile into a neutral position in which a respective rudder angle is 0°;
separating electrical and mechanical connections between the missile and the carrier aircraft;
detecting, via sensors of the missile, that the separating has occurred;
activating the autonomous flight control device and automatically controlling the missile with the flight control device and the control devices based upon correction flight condition variables caused by a prevailing downwash between the missile and the carrier aircraft; and
automatically controlling the missile with the flight control device and the control devices based on data stored in at least one storage device on the missile,
wherein the point in time at which the autonomous flight control starts depends on airspeed of the carrier aircraft during the separating of the electrical and mechanical connections.

5. The method in accordance with claim 4, wherein a time difference between the detected point in time of the occurrence of the separation and a point in time at which the autonomous flight control of the missile starts decreases with increasing airspeed.

6. The method for releasing an unmanned missile from a carrier aircraft, the missile having an autonomous flight control device that acts on control devices of the missile, the method comprising:
adjusting vertical rudders and elevators of the missile into a neutral position in which a respective rudder angle is 0°;
separating electrical and mechanical connections between the missile and the carrier aircraft;
detecting, via sensors of the missile, that the separating has occurred;
activating the autonomous flight control device and automatically controlling the missile with the flight control device and the control devices based upon correction flight condition variables caused by a prevailing downwash between the missile and the carrier aircraft; and
automatically controlling the missile with the flight control device and the control devices based on data stored in at least one storage device on the missile,
wherein a time at which the autonomous flight control of the missile starts depends on a flight altitude of the carrier aircraft during the occurrence of the electrical and mechanical separation of the missile from the carrier aircraft.

7. The method in accordance with claim 6, wherein a time difference between a point in time of the detection of the occurrence of the separation and the point in time, at which the autonomous flight control of the missile starts, becomes shorter as the flight altitude is lowered.

8. The method for releasing an unmanned missile from a carrier aircraft, the missile having an autonomous flight control device that acts on control devices of the missile, the method comprising:
adjusting vertical rudders and elevators of the missile into a neutral position in which a respective rudder angle is 0°;
separating electrical and mechanical connections between the missile and the carrier aircraft;
detecting, via sensors of the missile, that the separating has occurred;
activating the autonomous flight control device and automatically controlling the missile with the flight control device and the control devices based upon correction flight condition variables caused by a prevailing downwash between the missile and the carrier aircraft; and
automatically controlling the missile with the flight control device and the control devices based on data stored in at least one storage device on the missile,
wherein the automatically controlling comprises:
automatically controlling the missile by the flight control device and the control devices based upon data of a standard distancing procedure stored in a storage device of the missile; and automatically controlling the missile by the flight control device and the control devices based upon mission data stored in the storage device of the missile.

9. The method in accordance with claim 8, wherein the automatic controlling of the missile based upon stored mission data is not carried out until the distancing procedure has been completed.

10. An unmanned missile releasable from a carrier aircraft, comprising:
  control devices;
  vertical rudders and elevators positionable into a neutral position;
  at least one holding device engageable with a counterholding device on at least one of the carrier aircraft or a pylon of the carrier aircraft;
  separation detectors structured and arranged to detect at least one of an electrical and mechanical separation of the at least one holding device from the counterholding device;
  a timer structured and arranged to start upon detection of the at least one of the electrical and mechanical separation; and
  an avionic system comprising a flight control device and a storage device, the flight control device being activatable within 100 ms after the timer starts to act on the control devices to correct flight condition variables caused by a prevailing downwash after the separation, and the storage device storing data readable by the flight control device to control the control devices.

11. The unmanned missile in accordance with claim 10, wherein, before the timer starts, the flight control device does not control the control devices.

12. The unmanned missile in accordance with claim 10, wherein the flight control device is not activatable earlier than 30 ms after the timer starts.

13. The unmanned missile in accordance with claim 10, wherein the flight control device is activatable within a time window between 50 ms and 100 ms after the start of the time meter.

14. The unmanned missile in accordance with claim 10, wherein the storage device stores data for completing a distancing procedure and mission data.

15. The unmanned missile in accordance with claim 14, wherein the flight control device controls the control devices in accordance with the mission data after the distancing procedure is completed.

16. A method for releasing an missile from a carrier aircraft, the missile having control devices and an autonomous flight control device that acts on the control devices, the method comprising:
  adjusting vertical rudders and elevators of the missile into a position in which a respective rudder angle is 0°;
  separating at least one of an electrical and a mechanical connection between the missile and the carrier aircraft;
  starting a timer upon detecting the separating; and
  activating the flight control device within 100 ms of the timer starting to control the missile based upon correction flight condition variables caused by a prevailing downwash between the missile and the carrier aircraft after separating.

17. The method in accordance with claim 16, wherein the flight control device is not activated earlier than 30 ms after the start of the timer.

* * * * *